United States Patent
Li et al.

(10) Patent No.: US 12,099,431 B2
(45) Date of Patent: Sep. 24, 2024

(54) SOFTWARE LOG PROCESSING METHOD

(71) Applicant: Shenzhen Anke Baiteng Technology Co., LTD, Shenzhen (CN)

(72) Inventors: Shian Li, Shenzhen (CN); Qiufang He, Shenzhen (CN)

(73) Assignee: Shenzhen Anke Baiteng Technology Co., LTD, Shenzhen (CN)

( * ) Notice: Subject to any disclaimer, the term of this patent is extended or adjusted under 35 U.S.C. 154(b) by 0 days.

(21) Appl. No.: 18/541,063

(22) Filed: Dec. 15, 2023

(65) Prior Publication Data
US 2024/0111655 A1   Apr. 4, 2024

(30) Foreign Application Priority Data
Jan. 13, 2023  (CN) .......................... 202310075747.2

(51) Int. Cl.
G06F 9/44 (2018.01)
G06F 11/34 (2006.01)
H04L 67/02 (2022.01)

(52) U.S. Cl.
CPC .......... *G06F 11/3476* (2013.01); *H04L 67/02* (2013.01)

(58) Field of Classification Search
None
See application file for complete search history.

(56) References Cited

U.S. PATENT DOCUMENTS 9,081,898 B1 *  7/2015  Antova ............... G06F 11/3476
9,836,354 B1 * 12/2017  Potlapally ........... G06F 11/1484
2009/0031250 A1 *  1/2009  Boudreau ............. H04L 67/306
                                                                715/810
2011/0083123 A1 *  4/2011  Lou ..................... G06F 11/0706
                                                                717/125
2012/0303910 A1 * 11/2012  Ma ....................... G06F 11/3632
                                                                711/E12.001

(Continued)

FOREIGN PATENT DOCUMENTS

CN   105224445 A   1/2016
CN   114610689 A   6/2022

OTHER PUBLICATIONS

CNIPA, Notification of First Office Action for Chinese application CN202310075747.2, Jun. 20, 2023.

(Continued)

*Primary Examiner* — Qamrun Nahar (57) ABSTRACT

The present invention relates to the technical field of processing software logs, in particular a software log processing method. the present invention has the advantages of following up the unique service code enables all log contents to be automatically concatenated into a log block, and the system to concurrently count execution time, warnings and errors generated in each process, enabling the O&M operators and developers to quickly locate the problems when dealing with them at a later stage, in the scenarios such as a distributed system and microservice system, making it possible to unify the logs scattered in each system to the log platform for storage by way of the unique service code, as well as concatenate the execution timing in each system, greatly raising the treatment efficiency for the problems in the microservices or the distributed system and improving the maintainability of the distributed system or the microservice system.

4 Claims, 5 Drawing Sheets

(56) References Cited

U.S. PATENT DOCUMENTS

2014/0006854 A1* 1/2014 Bello .................. G06F 11/0736
714/15
2016/0085656 A1* 3/2016 Braun ................. G06F 11/3476
714/38.11

OTHER PUBLICATIONS

CNIPA, Notification of Second Office Action for Chinese application CN202310075747.2, Aug. 17, 2023.
CNIPA, Notification to grant patent right for Chinese application CN202310075747.2, Nov. 13, 2023.

* cited by examiner

SOFTWARE LOG PROCESSING METHOD

TECHNICAL FIELD

The present invention relates to the technical field of processing software logs, in particular a software log processing method.

BACKGROUND ART

During running an application program, it always occurs that a running result is inconsistent with an expected result, so an O&M operator or a developer needs to screen settings and bugs in the program to adjust or repair them to achieve an expected running result. In general, the O&M operator or the developer needs to call a program to run a log, so as to locate the problem that needs to be solved based on the log. However, in scenarios such as complex service logic, complex algorithms, concurrency, performance screening, big data, distributed systems and microservices, the O&M operator or the developer needs to locate the problem in a large number of diverse logs. Because of the problems such as that the O&M or the developer needs to locate the problem for a long time, the production environment is difficult to reproduce, and the input required by the program is not recorded, it is easy to bring a significant impact on service, O&M, or program debugging, and in severe cases, it may cause a long-term interruption to a key service.

At present, the technical field of computer software logs all adopt a method of writing a paragraph of text content by level among the program codes where it is easy to make errors or need to record logs, and then writing a log into a file, a database, a console, a page and so on, so as to achieve the purpose of recording logs, but the above method still has the following problems in actual use.

If all logs are recorded, in a formal environment where a software program is running, a large amount of log data will be recorded due to intensive service or a large number of users, so it will bring storage pressure. If the logs are recorded by level, for example, in the case that only error logs are recorded, under the conditions of complex service scenarios, if it is necessary to screen the problems in performance, configuration, and program, detailed log information will be lost, resulting in irreproducibility of logs; it is difficult to locate a log in a large number of logs, taking a lot of time; it is difficult to reproduce a software production environment in the logs; the development team's log norms are non-standard or uniform; the logs cannot be recorded in accordance with a service process. The scenarios such as complex service, complex algorithms (such as artificial intelligence), and high concurrency confuse log records and make them difficult to read. The method does not automatically provide a solution to the problem about the problem with higher-level logs. After the system exists for a long time, it is difficult to maintain their codes due to the inconsistency of the development team's coding norms, code comment norms, and log records, and for other team members taking over the codes, it is difficult to change them or it takes a lot of time to read relevant materials and understand the service. Even so, if subsequent codes change, that will bring a large number of bugs, resulting in poor system robustness and stability. A specific system bug always occurs under a certain precondition, so it is difficult to find system problems, especially in terms of security, even if logs are recorded.

SUMMARY OF THE INVENTION

The purpose of the present invention is aimed at solving at least one of the aforementioned technical defects.

Therefore, one objective of the present invention is to provide a software log processing method, so as to solve the problem mentioned in the background art and overcome the deficiencies existing in the prior art.

In order to achieve the above objective, an example of one aspect of the present invention provides a software log processing method, which includes the steps of S1. beginning, that is, starting recording logs and initiating a service process to create a log list;

S2. creating an unique service code;

S3. collecting environment-related information, that is, collecting relevant requests and Web server-related information for call requests such as method calls, HTTP, HTTPS and Socket;

S4. creating a log set, that is, temporarily storing logs in storage medium such as a file, a database and a memory;

S5. recording logs, that is, detecting thread information, so as to find problems of concurrency and multi-thread;

S6. ending recording logs, that is, finishing the current service procedure and process, then notifying completion of log-recording demand to the log system;

S7. automatically sorting out the log records, that is, analyzing the consumed time in the procedure and process according to demand, then classifying and sorting out the logs of different threads according to the order;

S8. storing, that is, deciding whether to record a log according to configuration, and writing the log into a designated storage medium; and S9. ending, that is, cleaning up temporary content, and removing it from the list.

As preferred than any one of the above technical solutions, S1 further includes the step of starting recording logs at the beginning of a program at the latest, and recording the demand of the service process.

The technical effect achieved by way of adopting the above solution is convenience for a developer party, an O&M party, and an user party to understand and screen the entire service.

As preferred than any one of the above technical solutions, S2 further includes the step of creating an unique code at the latest before starting recording logs, and enabling the log record and chain analysis to be done in a distributed system and a microservice system before starting recording logs.

The technical effect achieved by way of adopting the above solution is that the log record has the characteristics of service coherence and classification by way of enabling the unique code to run through the entire service procedure or process, so as to enable the O&M operators or the developers to quickly locate the problem.

As preferred than any one of the above technical solutions, the service initiator in the distributed system and the microservice system is responsible for creating a unique service code, transmitting the unique service code in each system, and the log system is responsible for collecting, sorting out, analyzing, and storing logs according to the unique service code.

The technical effect achieved by way of adopting the above solution is that the log record has the characteristics of service coherence and classification by way of enabling the unique service code to run through the entire service procedure or process, so as to enable the O&M operators or the developers to quickly locate the problem.

As preferred than any one of the above technical solutions, S3 further includes the steps of collecting client-related information by means of a C/S program and collecting thread-related information, and in S3 the step of collecting environment-related information further includes the following sub-steps.

C1. Applying for a request to input parameters;
C2. Collecting information related to transmission protocols;
C3. Collecting configuration information that influences the process;
C4. Collecting information related to the operating system.

The technical effect achieved by way of adopting the above solution is that collecting client information makes it convenient to analyze the environment-related information based on the client information, wherein the information related to the operating system includes hardware information such as memory and CPU.

As preferred than any one of the above technical solutions, S4 further includes the step of creating a log set separately based on the unique service code and adding it into the record list.

The technical effect achieved by way of adopting the above solution is that following up the unique service code enables all log contents to be automatically concatenated into a log block, and the system to concurrently count execution time, warnings and errors generated in each process, so that the O&M operators and developers can quickly locate the problems when dealing with them at a later stage.

As preferred than any one of the above technical solutions, S5 further includes the steps of enabling the unique service code to be carried in each log record to make the unique service code run through the entire service process, but enabling the solution to the problem to be recorded in the log during recording logs for a warning, an error, and a collapse of the system, and inputting parameters for each function record of the code.

The technical effect achieved by way of adopting the above solution is that the unique service code runs through the entire service process, so as to make it convenient to quickly find out problems and solve the problem without delay.

As preferred than any one of the above technical solutions, S6 further includes the step of on ending recording logs, returning parameters to a caller in the service process and enabling a requester to call them, and S8 further includes the steps of recording the logs related to the entire process together at the time of needing to record logs, and enabling the storage medium to include a file, a database, and a log platform.

The technical effect achieved by way of adopting the above solution is to make it convenient to record data and subsequently call it.

As preferred than any one of the above technical solutions, in S5 the step of detecting thread information includes the following sub-steps.

A1. Analyzing consumed time for a process;
A2. Analyzing a call chain;
A3. Analyzing a direct time difference from the last record;
A4. Judging whether a warning and error exist, if they exist, executing A5, if not, executing A6;
A5. Counting the quantity and recording the status of the process;
A6. Checking whether it is a multi-threaded call, if it is a multi-threaded call, executing A7, if it is not a multi-threaded call, ending the process;
A7. Pushing data into a sub-chain, and re-entering A2.

The technical effect achieved by way of adopting the above solution is that in the case of multi-thread the influence on the main program abates to almost zero by way of optimizing a thread pool, and the consumed time for executing the service process can be quickly located by way of Analyzing a direct time difference from the last record, so as to provide a decision support for system optimization and realize on-demand automatic analysis capabilities.

As preferred than any one of the above technical solutions, in S5 the step of recording logs includes the following sub-steps.

B1. Recording logs;
B2. Identifying according to a call interface and a log level, if a warning and error are found, executing B3, and if no error, executing B5;
B3. Checking record norms, if it is in accordance with the norms, executing B5, if it is not in accordance with the norms, executing B4;
B4. Bringing out the error, then recording the error according to the norms, and re-executing B1;
B5. Collecting the ID of the thread that records the log;
B6. Recording the caller's information;
B7. Depositing it into the log list corresponding to the service code;
B8. Ending these steps.

The technical effect achieved by way of adopting the above solution is that through the above steps, the error log can be recorded according to the norms, making it convenient to find out and sort out an error log.

Compared with the prior art, the present invention has the following advantages and beneficial effects.

1. As for the software log processing method, following up the unique service code enables all log contents to be automatically concatenated into a log block, and the system to concurrently count execution time, warnings and errors generated in each process, so that the O&M operators and developers can quickly locate the problems when dealing with them at a later stage. The log record has the characteristics of service coherence and classification by way of introducing the service procedure and process and the unique code and enabling the unique service code to run through the entire service procedure or process, so as to enable the O&M operators or the developers to quickly locate the problem.
2. As for the software log processing method, a solution can be provided in advance for log records such as warnings and errors by means of compulsory norms, so as to achieve the purpose of quickly solving problems.
3. As for the software log processing method, the quantity of the stored logs decreases by means of a selective log record without losing the detailed logs needed at the time of screening problems.
4. As for the software log processing method, recording environment information and inputting parameters for a function enables the debugging efficiency of developers to improve, and in the scenarios such as a distributed system and microservice system, it is possible to unify the logs scattered in each system to the log platform for storage by way of the unique service code, as well as concatenate the execution timing in each system, greatly raising the treatment efficiency for the problems in the microservices or the distributed system and improving the maintainability of the distributed system or the microservice system.

DETAILED DESCRIPTION OF THE PREFERRED EMBODIMENTS

The present invention is further described in combination with the drawings as follows, but the protection scope of the present invention is not limited to the following examples.

Example 1

Figure 1:
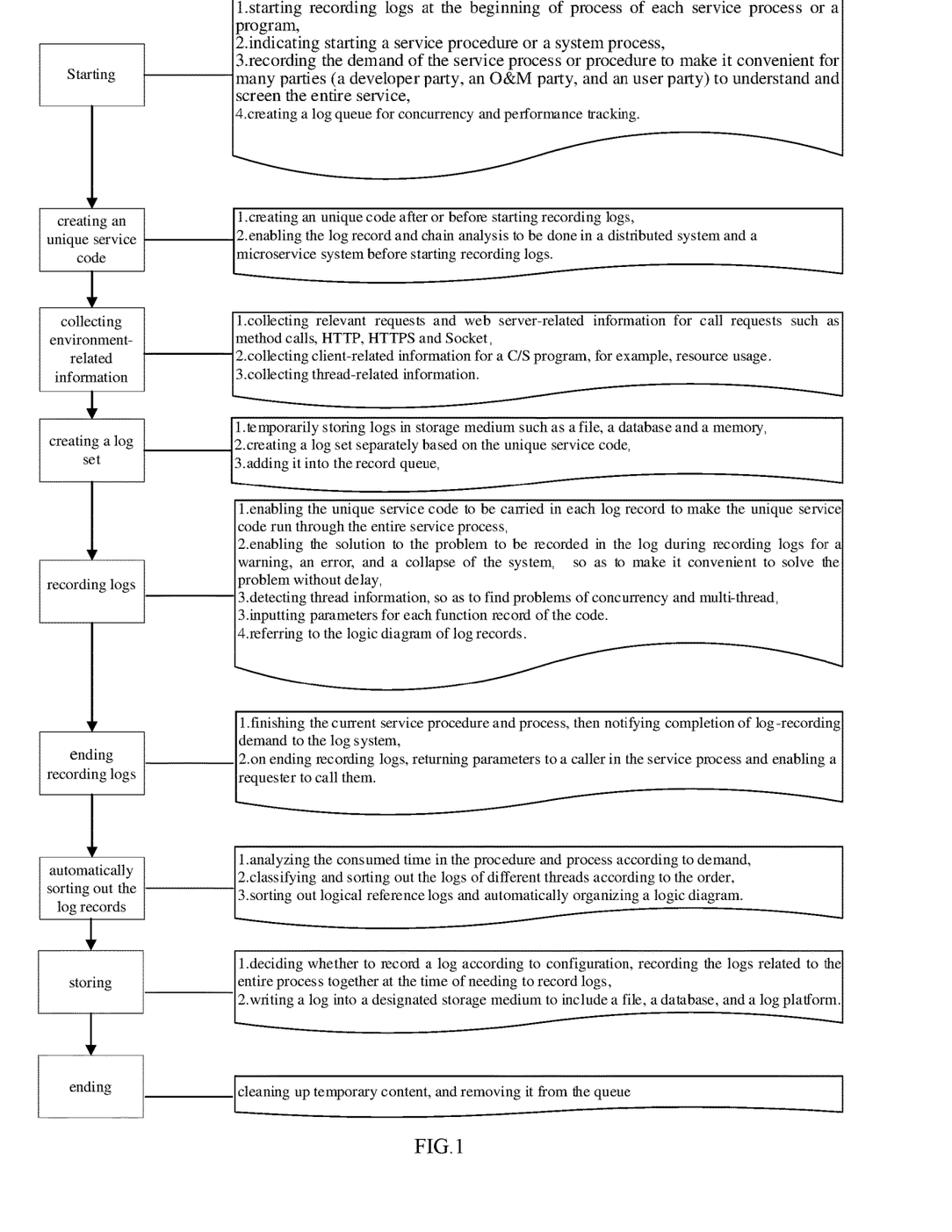
FIG. 1 is a flow chart of the method according to the present invention.
Figure 2:
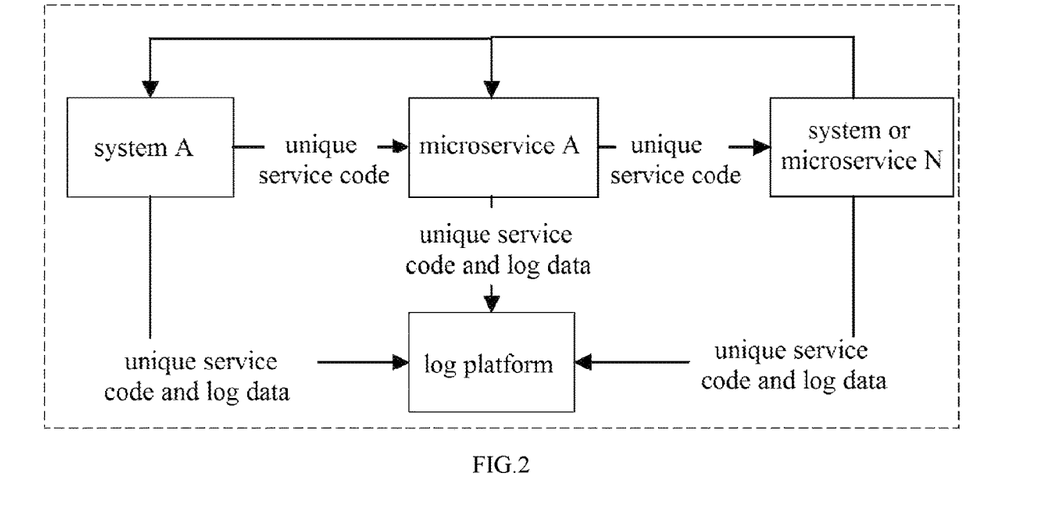
FIG. 2 is a schematic diagram of the distributed system and microservice system of the present invention.

As shown in FIGS. 1-2, a software log processing method includes the following steps.

S1. Beginning, that is, starting recording logs and initiating a service process to create a log list.

S2. Creating an unique service code.

S3. Collecting environment-related information, that is, collecting relevant requests and Web server-related information for call requests such as method calls, HTTP, HTTPS and Socket.

S4. Creating a log set, that is, temporarily storing logs in storage medium such as a file, a database and a memory.

S5. Recording logs, that is, detecting thread information, so as to find problems of concurrency and multi-thread.

S6. Ending recording logs, that is, finishing the current service procedure and process, then notifying completion of log-recording demand to the log system.

S7. Automatically sorting out the log records, that is, analyzing the consumed time in the procedure and process according to demand, then classifying and sorting out the logs of different threads according to the order.

S8. Storing, that is, deciding whether to record a log according to configuration, and writing the log into a designated storage medium.

S9. Ending, that is, cleaning up temporary content, and removing it from the list.

As an optional technical solution of the present invention, S1 further includes the step of starting recording logs at the beginning of a program at the latest, and recording the demand of the service process.

As an optional technical solution of the present invention, S2 further includes the step of creating an unique code at the latest before starting recording logs, and enabling the log record and chain analysis to be done in a distributed system and a microservice system before starting recording logs.

As an optional technical solution of the present invention, the service initiator in the distributed system and the microservice system is responsible for creating a unique service code, transmitting the unique service code in each system, and the log system is responsible for collecting, sorting out, analyzing, and storing logs according to the unique service code, the logs within each system are consistent with those in FIG. 2, and the data is unitarily stored in the log platform at the end of the storage, so it is always compulsory for developers to provide an expected solution to warnings and errors in a specific development process, so as to facilitate a subsequent O&M operator to deal with the problem, if the date is not coded according to the norms, it is intercepted by a compiler, so it cannot be compiled, only after the date is compulsorily standardized, it can pass compilation.

Figure 5:
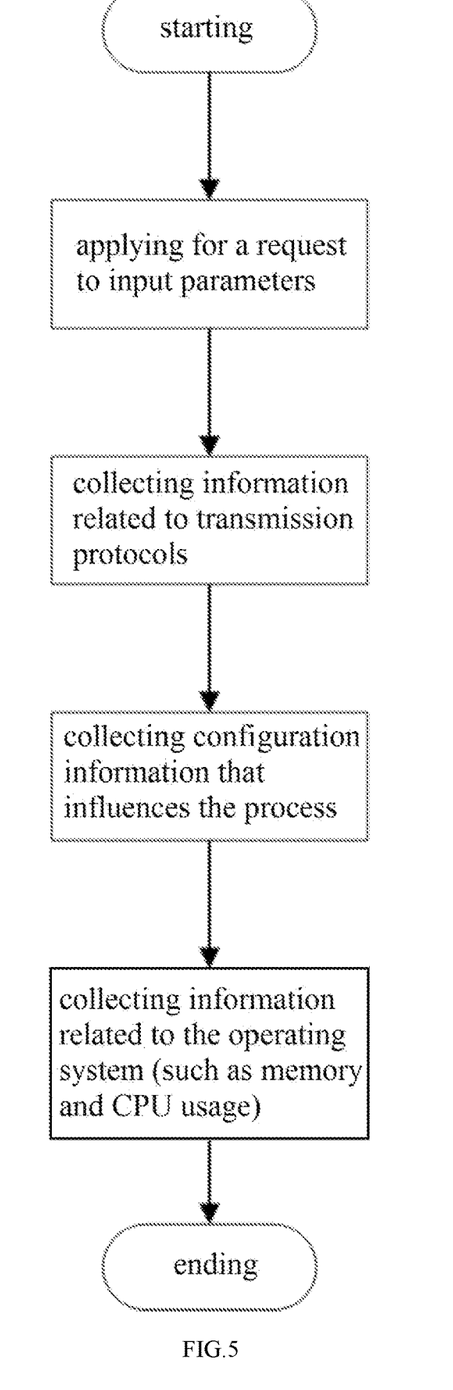
FIG. 5 is a flow chart of the step of collecting environment-related information in the present invention.

As an optional technical solution of the present invention, S3 further includes the steps of collecting client-related information by means of a C/S program and collecting thread-related information, and in S3 the step of collecting environment-related information further includes the following sub-steps.

C1. Applying for a request to input parameters;

C2. Collecting information related to transmission protocols;

C3. Collecting configuration information that influences the process;

C4. Collecting information related to the operating system.

Figure 4:
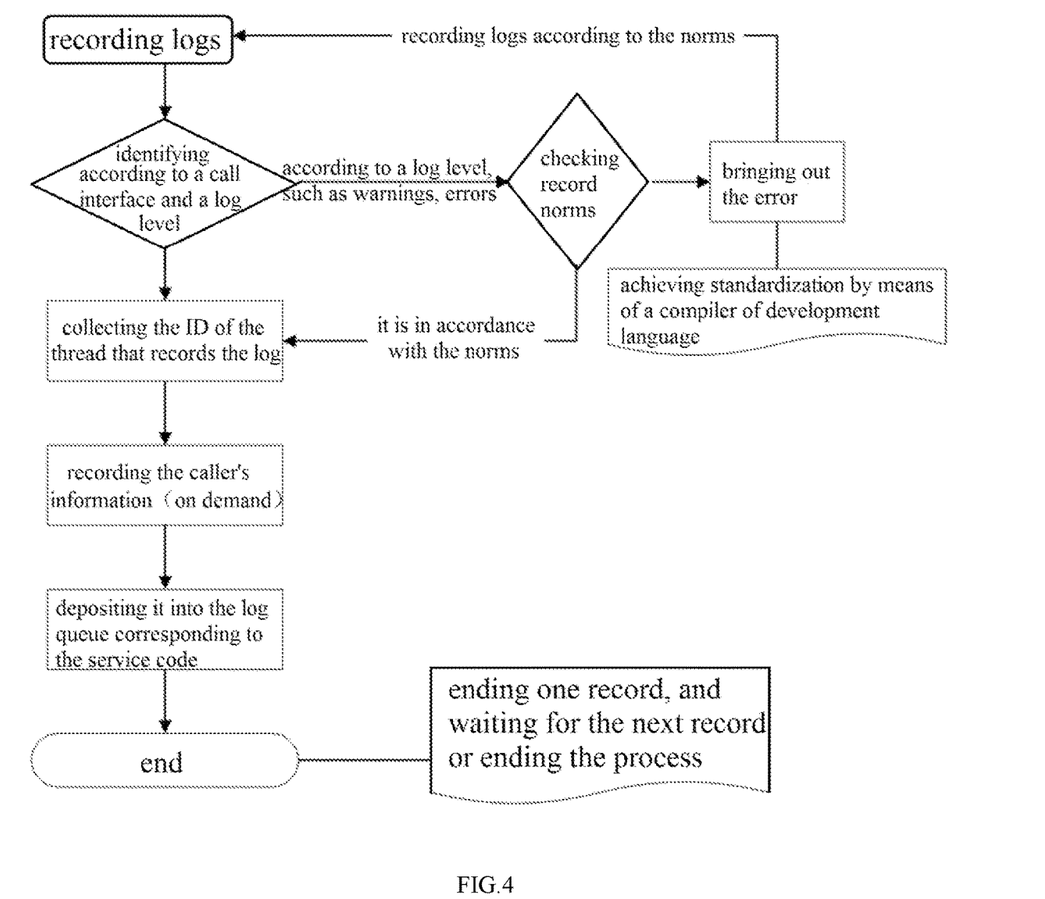
FIG. 4 is a logical flow chart of the step of recording logs in the present invention.

As an optional technical solution of the present invention, S4 further includes the steps of creating a log set separately based on the unique service code and adding it into the record list, then enabling the service initiator to be responsible for creating a unique service code and transmitting the unique service code in each system, and enabling the log system to be responsible for collecting, sorting out, analyzing, and storing logs according to the unique service code, then enabling the logs within each system to be consistent with those in FIG. 4, next storing the data in the log platform at the end of the storage.

As an optional technical solution of the present invention, S5 further includes the steps of enabling the unique service code to be carried in each log record to make the unique service code run through the entire service process, but enabling the solution to the problem to be recorded in the log during recording logs for a warning, an error, and a collapse of the system, and inputting parameters for each function record of the code.

As an optional technical solution of the present invention, S6 further includes the step of on ending recording logs, returning parameters to a caller in the service process and enabling a requester to call them, and S8 further includes the steps of recording the logs related to the entire process together at the time of needing to record logs, and enabling the storage medium to include a file, a database, and a log platform.

Figure 3:
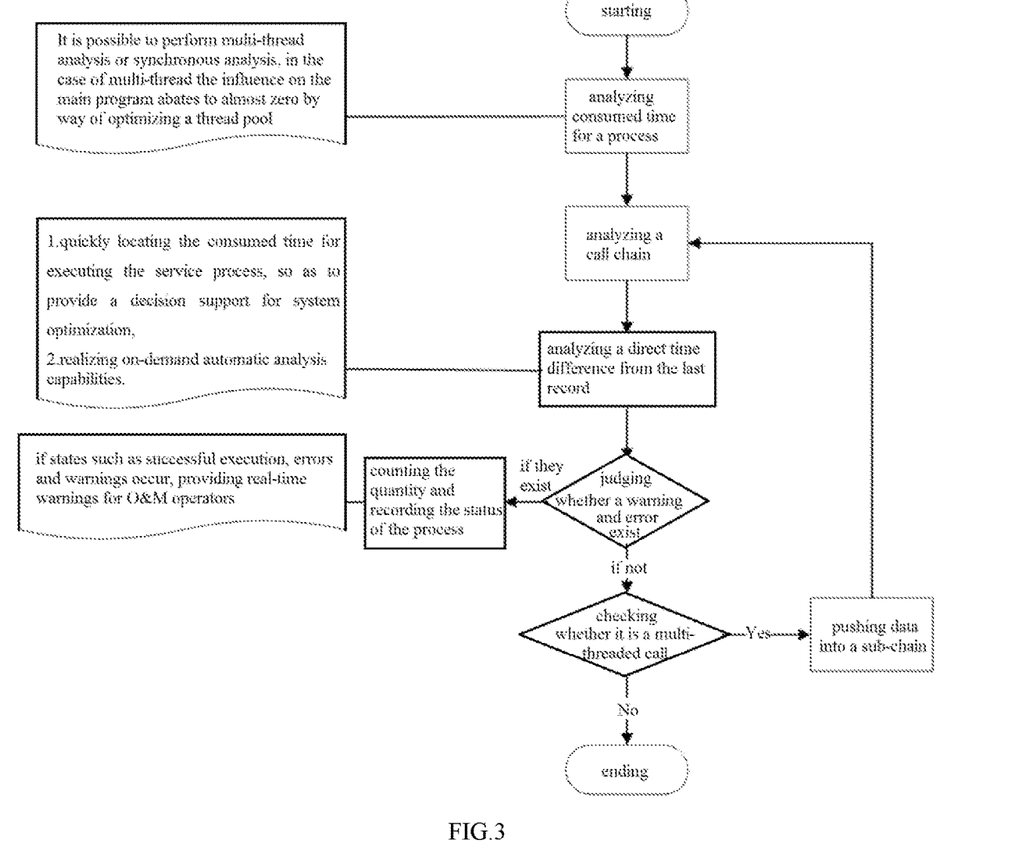
FIG. 3 is a logical flow chart of the step of detecting thread information in the present invention.

As an optional technical solution of the present invention, in S5 the step of detecting thread information includes the following sub-steps.

A1. Analyzing consumed time for a process.

A2. Analyzing a call chain.

A3. Analyzing a direct time difference from the last record.

A4. Judging whether a warning and error exist, if they exist, executing A5, if not, executing A6.

A5. Counting the quantity and recording the status of the process, if states such as successful execution, errors and warnings occur, providing real-time warnings for O&M operators.

A6. Checking whether it is a multi-threaded call, if it is a multi-threaded call, executing A7, if it is not a multi-threaded call, ending the process.

A7. Pushing data into a sub-chain, and re-entering A2.

As an optional technical solution of the present invention, in S5 the step of recording logs includes the following sub-steps.

B1. Recording logs.

B2. Identifying according to a call interface and a log level, if a warning and error are found, executing B3, and if no error, executing B5.

B3. Checking record norms, if it is in accordance with the norms, executing B5, if it is not in accordance with the norms, executing B4.

B4. Bringing out the error, then recording the error according to the norms, and re-executing B 1, achieving standardization of recording errors by means of a compiler of development language and bringing out the error.

B5. Collecting the ID of the thread that records the log.

B6. Recording the caller's information.

B7. Depositing it into the log list corresponding to the service code.

B8. Ending these steps, that is, ending one record, and waiting for the next record or ending the process.

In conclusion, as for the software log processing method, following up the unique service code enables all log contents to be automatically concatenated into a log block, and the system to concurrently count execution time, warnings and errors generated in each process, so that the O&M operators and developers can quickly locate the problems when dealing with them at a later stage. The log record has the characteristics of service coherence and classification by way of introducing the service procedure and process and the unique code and enabling the unique service code to run through the entire service procedure or process, so as to enable the O&M operators or the developers to quickly locate the problem; a solution can be provided in advance for log records such as warnings and errors by means of compulsory norms, so as to achieve the purpose of quickly solving problems; the quantity of the stored logs decreases by means of a selective log record without losing the detailed logs needed at the time of screening problems; recording environment information and inputting parameters for a function enables the debugging efficiency of developers to improve, and in the scenarios such as a distributed system and microservice system, the logs scattered in each system can be unified to the log platform for storage by way of the unique service code, as well as concatenated at the time of execution timing in each system, greatly raising the treatment efficiency for the problems in the microservices or the distributed system and improving the maintainability of the distributed system or the microservice.

In the description, the reference terms "one example", "some example", "instances", "specific instances", or "some instances" and so on, are intended to mean that a specific feature, a structure, material, or a characteristic described in combination with the instance or example is contained in at least one instance or example of the present invention. In this description, the schematic statement about the above terms does not necessarily refer to the same instance or example. Furthermore, the specific feature, the structure, the material, or the characteristic described herein may be combined with each other in an appropriate manner in any one or more instances or examples.

It is not difficult for a person skilled in the art to understand that the present invention includes any combinations of the invention contents and specific embodiments of the above-mentioned description and all the parts shown in the drawings, in view of shortening the paper, we did not describe all the solutions composed of these combinations in order to make the description concise. Any modifications, equivalent substitutions, improvements and the likes made within the essence and principle of the present invention shall fall within the protection scope of the present invention.

Although the above description has shown and described the examples of the present invention, it is understandable that the above examples are illustrative and cannot be construed as a limitation on the present invention, so a person skilled in the art may make a change, modification, substitution and variant on the above examples within the scope of the present invention by way of departing from the principle and essence of the present invention.

What is claimed is:

1. A software log processing method, comprising steps of
Step 1, beginning, starting recording logs and initiating a service process to create a log queue;
Step 2, creating a unique service code;
Step 3, collecting environment-related information, collecting relevant requests and Web server-related information for call requests including method calls, HTTP, HTTPS and Socket;
Step 4, creating a log set, temporarily storing logs in storage medium including a file, a database and a memory;
Step 5, recording logs, detecting thread information, so as to find problems of concurrency and multi-thread;
Step 6, ending recording logs, finishing current service procedure and process, then notifying completion of log-recording demand to a log system;
Step 7, automatically sorting out log records, analyzing consumed time in the procedure and process according to demand, then classifying and sorting out the logs of different threads according to an order;
Step 8, storing, deciding whether to record the log according to configuration, and writing the log into a designated storage medium; and
Step 9, ending, cleaning up temporary content, and removing the temporary content from the queue;
wherein Step 3 further includes the steps of collecting client-related information for a C/S program and collecting thread-related information, and in Step 3 the step of collecting environment-related information further includes the sub-steps of
Sub-step 1, applying for a request to input parameters;
Sub-step 2, collecting information related to transmission protocols;
Sub-step 3, collecting configuration information that influences the process; and
Sub-step 4, collecting information related to an operating system;
Step 4 further includes the step of creating the log set separately based on the unique service code and adding the log set into a record queue;
Step 5 further includes the steps of enabling the unique service code to be carried in each log record to make the unique service code run through the entire service process, but enabling a solution to a problem to be recorded in the log during the recording logs for a warning, an error, and a collapse of the log system, and inputting parameters for each function record of the unique service code;
Step 6 further includes the step of on ending recording logs, returning parameters to a caller in the service process and enabling a requester to call them, and Step 8 further includes the steps of recording the logs related to the entire process together at time of needing to record logs, and enabling the storage medium to include the file, the database, and a log platform;
in Step 5 the step of detecting thread information includes the sub-steps of Sub-step 5, analyzing the consumed time for the process;

Sub-step 6, analyzing a call chain;

Sub-step 7, Analyzing a direct time difference from a last record;

Sub-step 8, judging whether a warning and error exist, if the warning and the error exist, executing Sub-step 9, if not, executing Sub-step 10;

Sub-step 9, counting a quantity and recording a status of the process;

Sub-step 10, checking whether the process is a multi-threaded call, if the process is a multi-threaded call, executing Sub-step 11, if the process is not a multi-threaded call, ending the process; and Sub-step 11, pushing data into a sub-chain, and re-entering Sub-step 6;

in Step 5 the step of recording logs includes the sub-steps of

Sub-step 12, recording the logs;

Sub-step 13, identifying according to a call interface and a log level, if the warning and the error are found, executing Sub-step 14, and if no error, executing Sub-step 16;

Sub-step 14, checking record norms, if the record norms are in accordance with the norms, executing Sub-step 16, if the record norms are not in accordance with the norms, executing Sub-step 15;

Sub-step 15, bringing out the error, then recording the error according to the norms, and re-executing Sub-step 12;

Sub-step 16, collecting an ID of the thread that records the log;

Sub-step 17, recording a caller's information;

Sub-step 18, depositing the caller's information into the log queue corresponding to the unique service code; and Sub-step 19, ending these steps.

2. The software log processing method according to claim 1, wherein Step 1 further includes the step of starting recording logs at beginning of the C/S program at latest, and recording a demand of the service process.

3. The software log processing method according to claim 1, wherein Step 2 further includes the step of creating the unique service code at latest before starting recording the logs, and enabling the log record and chain analysis to be done in a distributed system and a microservice system before starting recording the logs.

4. The software log processing method according to claim 3, wherein a service initiator in said distributed system and said microservice system is responsible for creating the unique service code, transmitting the unique service code in each system, and said log system is responsible for collecting, sorting out, analyzing, and storing logs according to the unique service code.

* * * * *